(12) United States Patent
Shao et al.

(10) Patent No.: US 8,386,849 B2
(45) Date of Patent: Feb. 26, 2013

(54) NOISY MONITOR DETECTION AND INTERMITTENT FAULT ISOLATION

(75) Inventors: Qingqiu Ginger Shao, Oro Valley, AZ (US); Randy R. Magnuson, Scottsdale, AZ (US); Dave Miller, Minneapolis, MN (US); Bradley John Barton, Albuquerque, NM (US); David Michael Kolbet, Scottsdale, AZ (US)

(73) Assignee: Honeywell International Inc., Morristown, NJ (US)

(*) Notice: Subject to any disclaimer, the term of this patent is extended or adjusted under 35 U.S.C. 154(b) by 464 days.

(21) Appl. No.: 12/696,877

(22) Filed: Jan. 29, 2010

(65) Prior Publication Data

US 2011/0191635 A1 Aug. 4, 2011

(51) Int. Cl.
*G06F 11/00* (2006.01)
(52) U.S. Cl. .................... 714/25; 714/37; 714/48
(58) Field of Classification Search ............ 714/25, 714/37, 48
See application file for complete search history.

(56) References Cited

U.S. PATENT DOCUMENTS

| | | | |
|---|---|---|---|
| 4,134,642 A * | 1/1979 | Kapron et al. ................ 385/127 |
| 5,210,704 A | 5/1993 | Husseiny | |
| 5,243,686 A * | 9/1993 | Tokuda et al. ................ 704/200 |
| 5,260,945 A | 11/1993 | Rodeheffer | |
| 5,293,323 A * | 3/1994 | Doskocil et al. ............. 702/185 |
| 5,586,066 A | 12/1996 | White et al. | |
| 5,602,761 A | 2/1997 | Spoerre et al. | |
| 5,668,778 A * | 9/1997 | Quazi ........................... 367/135 |
| 5,787,138 A | 7/1998 | Ocieczek et al. | |
| 5,987,399 A | 11/1999 | Wegerich et al. | |
| 5,991,707 A | 11/1999 | Searles et al. | |
| 6,055,491 A | 4/2000 | Biliris et al. | |
| 6,073,089 A | 6/2000 | Baker et al. | |
| 6,170,436 B1 * | 1/2001 | Goodson et al. ............... 119/220 |
| 6,202,038 B1 | 3/2001 | Wegerich et al. | |
| 6,343,261 B1 * | 1/2002 | Iwanowski et al. ........... 702/183 |
| 6,510,397 B1 | 1/2003 | Choe | |
| 6,560,584 B1 | 5/2003 | Afshar et al. | |
| 6,594,620 B1 | 7/2003 | Qin et al. | |
| 6,615,040 B1 * | 9/2003 | Benveniste .................. 455/423 |
| 6,694,285 B1 | 2/2004 | Choe et al. | |
| 6,804,628 B2 | 10/2004 | Gross et al. | |
| 6,816,810 B2 | 11/2004 | Henry et al. | |
| 6,947,797 B2 | 9/2005 | Dean et al. | |
| 7,006,947 B2 | 2/2006 | Tryon, III et al. | |
| 7,076,695 B2 | 7/2006 | McGee et al. | |
| 7,158,917 B1 | 1/2007 | Bickford | |
| 7,188,050 B2 | 3/2007 | Yuan et al. | |
| 7,213,174 B2 | 5/2007 | Dahlquist et al. | |
| 7,380,172 B2 | 5/2008 | Srinivas et al. | |
| 7,412,356 B1 | 8/2008 | Dzenitis et al. | |

(Continued)

OTHER PUBLICATIONS

EP Search Report, EP 10189504.3-1225 dated Jun. 7, 2011.

(Continued)

*Primary Examiner* — Loan L. T. Truong
(74) *Attorney, Agent, or Firm* — Ingrassia Fisher & Lorenz, P.C.

(57) ABSTRACT

A method of detecting and diagnosing system faults, includes detecting the noisy status of a monitor during operations and incorporating a quantified monitor uncertainty level to support fault isolation reasoning. A sequential probability ratio test is used to statistically test the noisy status of a monitor and Shannon's entropy theory is used to quantify the uncertainty levels of the monitor to support the use of the monitor values in fault isolation.

7 Claims, 11 Drawing Sheets

U.S. PATENT DOCUMENTS

| | | |
|---|---|---|
| 7,444,268 B1 | 10/2008 | Kalamegham et al. |
| 7,451,003 B2 | 11/2008 | Chester et al. |
| 7,533,070 B2 | 5/2009 | Guralnik et al. |
| 7,539,593 B2 | 5/2009 | Machacek |
| 2002/0138796 A1 | 9/2002 | Jacob |
| 2005/0251364 A1* | 11/2005 | Kang et al. .................... 702/183 |
| 2006/0186927 A1* | 8/2006 | Cusmano et al. ............... 327/34 |
| 2007/0223596 A1* | 9/2007 | Fan .......................... 375/240.29 |
| 2007/0255672 A1* | 11/2007 | Olsson ............................ 706/56 |
| 2008/0062004 A1* | 3/2008 | Hammerschmidt ..... 340/870.01 |
| 2008/0198950 A1 | 8/2008 | Suyama |
| 2008/0294578 A1 | 11/2008 | de Kleer |
| 2009/0132442 A1* | 5/2009 | Subramaniam et al. ........ 706/12 |
| 2009/0185320 A1* | 7/2009 | Meyer ............................. 361/78 |
| 2010/0015935 A1* | 1/2010 | Zeng et al. .................... 455/206 |

OTHER PUBLICATIONS

EP Communication, EP 10189504.3-1225 dated May 8, 2011.

* cited by examiner

| N_m | M_1 | N_s_1 | M_2 | N_s_2 | M_3 | N_s_3 | M_4 | N_s_4 | M_5 | N_s_5 |
|---|---|---|---|---|---|---|---|---|---|---|
| 1 | 1 | 1 | 1 | 1 | 1 | 1 | 1 | 1 | 1 | 1 |
| 2 | 1 | 2 | 1 | 2 | 1 | 2 | 1 | 2 | 0 | 1 |
| 3 | 1 | 3 | 1 | 3 | 0 | 2 | 0 | 2 | 1 | 2 |
| 4 | 1 | 4 | 0 | 3 | 1 | 3 | 1 | 3 | 0 | 2 |
| 5 | 1 | 5 | 0 | 3 | 0 | 3 | 0 | 3 | 0 | 2 |
| 6 | 1 | 6 | 0 | 3 | 0 | 3 | 1 | 4 | 1 | 3 |
| 7 | 1 | 7 | 0 | 3 | 1 | 4 | 0 | 4 | 0 | 3 |
| 8 | 1 | 8 | 0 | 3 | 0 | 4 | 1 | 5 | 0 | 3 |
| 9 | 1 | 9 | 0 | 3 | 0 | 4 | 1 | 6 | 1 | 4 |
| 10 | 1 | 10 | 0 | 3 | 0 | 4 | 1 | 7 | 1 | 5 |
| 11 | 1 | 11 | 0 | 3 | 0 | 4 | 1 | 8 | 1 | 6 |
| 12 | 1 | 12 | 0 | 3 | 0 | 4 | 1 | 9 | 0 | 6 |
| 13 | 1 | 13 | 0 | 3 | 0 | 4 | 1 | 10 | 1 | 7 |
| 14 | 1 | 14 | 0 | 3 | 0 | 4 | 1 | 11 | 0 | 7 |
| 15 | 1 | 15 | 0 | 3 | 0 | 4 | 1 | 12 | 1 | 8 |
| 16 | 1 | 16 | 0 | 3 | 0 | 4 | 1 | 13 | 0 | 8 |

FIG. 8

| Nm | M_1 | Ns_1 | p1 | H(p1) |
|---|---|---|---|---|
| | | | | |
| 1 | 1 | 1 | 1 | 0 |
| 2 | 1 | 2 | 1 | 0 |
| 3 | 1 | 3 | 1 | 0 |
| 4 | 1 | 4 | 1 | 0 |
| 5 | 1 | 5 | 1 | 0 |
| 6 | 1 | 6 | 1 | 0 |
| 7 | 1 | 7 | 1 | 0 |
| 8 | 1 | 8 | 1 | 0 |
| 9 | 1 | 9 | 1 | 0 |
| 10 | 1 | 10 | 1 | 0 |
| 11 | 1 | 11 | 1 | 0 |
| 12 | 1 | 12 | 1 | 0 |
| 13 | 1 | 13 | 1 | 0 |
| 14 | 1 | 14 | 1 | 0 |
| 15 | 1 | 15 | 1 | 0 |
| 16 | 1 | 16 | 1 | 0 |
| | | | | |
| M=1 | PERMANENT FAULT | | | |

FIG. 11

| Nm | M_5 | Ns_5 | p5 | H(p5) |
|---|---|---|---|---|
|  |  |  |  |  |
| 1 | 1 | 1 | 1.000 | 0.000 |
| 2 | 0 | 1 | 0.500 | 1.000 |
| 3 | 1 | 2 | 0.667 | 0.918 |
| 4 | 0 | 2 | 0.500 | 1.000 |
| 5 | 0 | 2 | 0.400 | 0.971 |
| 6 | 1 | 3 | 0.500 | 1.000 |
| 7 | 0 | 3 | 0.429 | 0.985 |
| 8 | 0 | 3 | 0.375 | 0.954 |
| 9 | 1 | 4 | 0.444 | 0.991 |
| 10 | 1 | 5 | 0.500 | 1.000 |
| 11 | 1 | 6 | 0.545 | 0.994 |
| 12 | 0 | 6 | 0.500 | 1.000 |
| 13 | 1 | 7 | 0.538 | 0.996 |
| 14 | 0 | 7 | 0.500 | 1.000 |
| 15 | 1 | 8 | 0.533 | 0.997 |
| 16 | 0 | 8 | 0.500 | 1.000 |
|  |  |  |  |  |
| M=? | SPURIOUS (NOISY MONITOR) OR INTERMITTENT FAULT |  |  |  |

FIG. 12

NOISY MONITOR DETECTION AND INTERMITTENT FAULT ISOLATION

This invention was made with Government support under Prime Contract No. W56 HZV-05-C-0724, and sub-contract Nos. 3EC1893 and 5EC8407 awarded by Boeing. The Government has certain rights in the invention.

FIELD OF THE INVENTION

The present invention generally relates to data processing systems and methods and more particularly to differentiating spurious faults from noisy monitors having intermittent system faults.

BACKGROUND OF THE INVENTION

An intermittent fault may appear and disappear within a data processing system without taking any actions such as repairs or changes to the system configuration. The fault may be detected from the intermittency of its sensing signals. This detection can be converted to a diagnostic monitor, with a "0" indicating no faults detected (exonerating) and a "1" indicating a fault detected (indicating). However, known systems are not effective in distinguishing temporary abnormal sensor values generated by a noisy monitor or transient environmental conditions from intermittent faults which may become permanent faults, resulting in, for example, incorrect information or a connector problem. It would be advantageous to distinguish between these temporary abnormal sensor values from intermittent faults that may lead to a permanent fault.

Real-time detection and diagnostics of intermittent faults has been a challenge for diagnostics of systems. One aspect is related to the intermittent nature of the fault itself. The two main challenges associated with the intermittent nature are 1) the unpredictable frequency that the fault occurs, which makes the detection difficult, and 2) the causes of the fault, which depend not only the potential fault of the system under study, but also the unpredictable transient environmental conditions. The other aspect is related to the sensors/monitors used to detect the faults. It is quite possible that the system under detection has no faults, but the sensors/monitors themselves are noisy due to their own faults.

What makes the real-time detection and diagnostics difficult is the sampling of the events. The unpredictable nature of the faults makes it difficult to determine how long an event should be monitored before it may be concluded whether the detected fault is a true fault of the system, the monitor is noisy, or a situation exists that needs further monitoring.

Accordingly, it is desirable to provide a method and system for differentiating spurious faults, which for example may be caused by a noisy monitor or transient environmental conditions producing temporary abnormal sensor values, from intermittent system faults. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

A method of detecting and diagnosing system faults includes detecting the noisy status of a monitor during operations and incorporating a quantified monitor uncertainty level to support fault isolation reasoning.

Another method of detecting and diagnosing system faults includes collecting data and performing an assessment of a monitor of the data to determine whether the monitor is noisy. If the monitor is not noisy, fault isolation is determined. If it cannot be determined that the monitor is not noisy, additional data is collected. An assessment is made of whether the monitor is noisy or there is an intermittent fault. If the assessment cannot be made, uncertainties of the monitors are determined.

BRIEF DESCRIPTION OF THE DRAWINGS

The present invention will hereinafter be described in conjunction with the following drawing figures, wherein like numerals denote like elements.

FIG. 8 is a table of observed values of the five scenarios of FIGS. 2-6;

FIG. 11 is a table of values for uncertainty calculations for the scenario of FIG. 2;

FIG. 12 is a table of values for uncertainty calculations for the scenario of FIG. 6.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding technical field, background, brief summary, or the following detailed description.

The exemplary embodiments described herein use the Sequential Probability Ratio Test (SPRT) to statistically test the noisy status of monitors. A SPRT is a Bayesian Statistical Procedure that requires a detailed description of the expectations of the outcome of the model prior to executing the data collection. If certain conditions are met during the data collection, decisions are taken with regard to continuing the data collection and the interpretation of the gathered data. As the data is collected, a sum of a log-likelihood ratio is calculated. If the sum exceeds a first pre-defined threshold, a first pre-defined hypothesis is accepted, or if the sum is less than a second threshold, a second pre-defined hypothesis is accepted. Analyzing the data while it is being collected allows for early conclusions than in classical hypothesis testing.

Shannon's Entropy theory is used to quantify the uncertainty levels of monitors to support the use of the monitor values in fault isolation. In information theory (data processing), entropy is a measure of the uncertainty associated with a random variable. Shannon's entropy is a measure, typically in bits, of the expected value of the information. More specifically, Shannon's Entropy theory is a measure of the average information content when the random variable is unknown. For example, if two events are equally possible, the entropy is one (bit), or if one of the events is absolutely going to occur, the entropy is zero. An entropy value X of a random event therefore would be $0 \leq X \leq 1$. Shannon's entropy conventionally has been used to measure the information contained in a message as opposed to the portion of the message that is predictable, such as redundancy in language structure or statistical properties relating to the occurrence frequencies of letter or word repetition.

Based on the decision made, the monitors may or may not be taken into account in the fault diagnostic reasoning. If no noisy monitors are detected based on the above algorithms, and the intermittency of the faults exceed an expected value, then the fault is declared intermittent.

Figure 1:
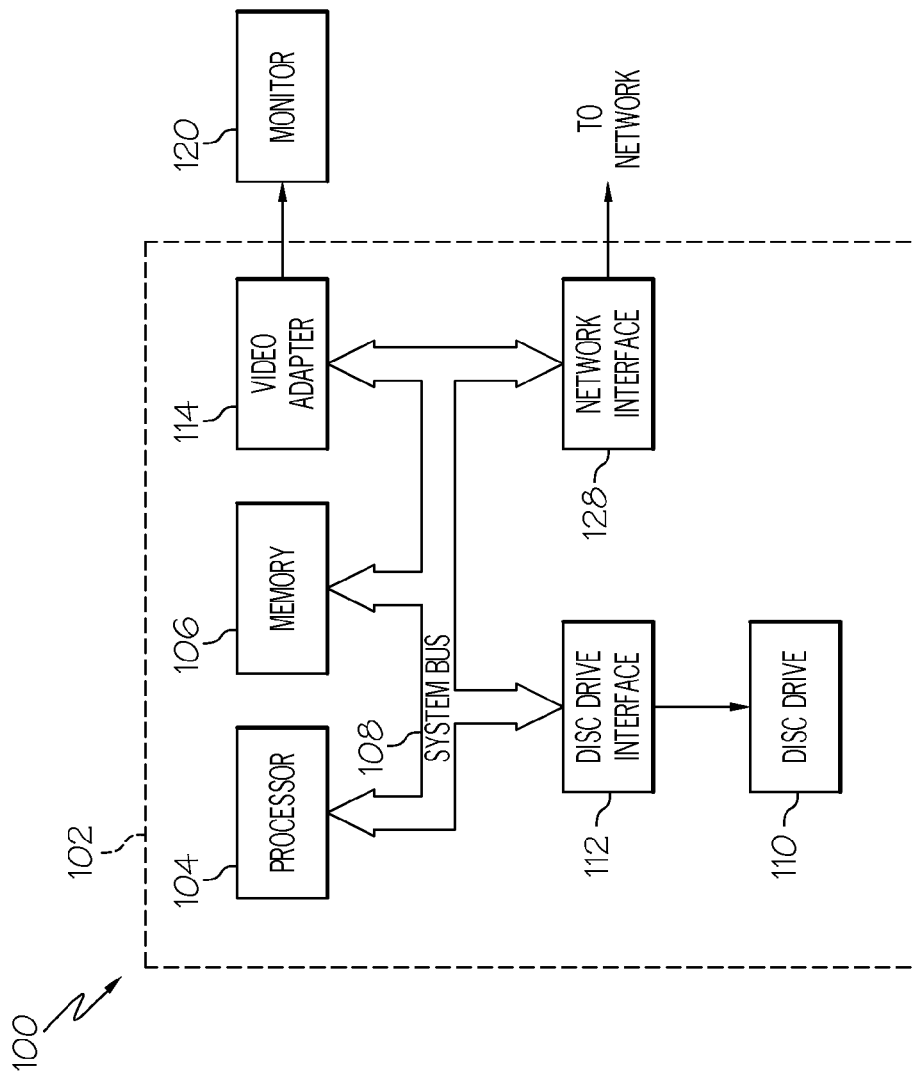
FIG. 1 is a block diagram of a computer system which can be adapted for use in implementing the preferred embodiments.

Referring to FIG. 1, a block diagram of a data processing apparatus 100 which can be utilized to implement the exemplary embodiments described herein can be configured as a general purpose computing device, such as a computer 102. The data-processing apparatus 100 generally includes a processor 104, a memory 106, and a system bus 108 that operatively couples the various system components to the processor 104. The processor 104 may comprise, for example, a single central processor (CPU) or a parallel processing environment.

The data-processing apparatus 100 further includes one or more data storage devices, such as disc drive 110, for storing and reading program and other data. The disc drive 110 may comprise one or more of, for example, a hard disk drive, a magnetic disc drive, or an optical disc drive (not shown), and is coupled to the system bus 108 by a disk drive interface 112. These disk drives 110 and their associated computer-readable media provide nonvolatile storage of computer-readable instructions, data structures, program modules, and other data for use by the data-processing apparatus 100. A monitor 120 is coupled to the system bus 108 by an adaptor 114 or other interface. Additionally, the data-processing apparatus 100 may include other peripheral output devices (not shown) including, for example, speakers and printers.

Note that the exemplary embodiments disclosed herein can be implemented in the context of a host operating system and one or more modules. In the computer programming arts, a software module can be typically implemented as a collection of routines and/or data structures that perform particular tasks or implement a particular abstract data type.

Software modules generally comprise instruction media storable within a memory location of a data-processing apparatus and are typically composed of two parts. First, a software module may list the constants, data types, variables, routines, and the like that can be accessed by other modules or routines. Second, a software module can be configured as an implementation, which can be private (accessible perhaps only to the module), and that contains the source code that actually implements the routines or subroutines upon which the module is based. The term module, as utilized herein, can therefore refer to software dules or implementations thereof. Such modules can be utilized separately or together to form a program product that can be implemented though signal-bearing media, including transmission media and recordable media.

It is important to note that, although the embodiments are described in the context of a fully functional data-processing apparatus 100 such as a computer, those skilled in the art will appreciate that the mechanisms of the present invention are capable of being distributed as a program product in a variety of forms, and that the described exemplary embodiments applies equally regardless of the particular type of signal-bearing media utilized to actually carry out the distribution. Examples of signal bearing media include, but are not limited to, recordable-type media such as floppy disks or CD ROMs, and transmission type media such as analogue or digital communication links.

Any type of computer-readable media that can store data that is accessible by a computer, such as magnetic cassettes, flash memory cards, digital versatile discs (DVDs), Bernoulli cartridges, random access memories (RAMs) and read only memories can be used in connection with the embodiments.

The data-processing apparatus 100 can operate in a networked environment using logical connections to one or more remote computers (not shown). These logical connections are implemented using a communication device coupled to or integral with the data-processing apparatus. The data sequence to be analyzed can reside on a remote computer in the networked environment. The remote computer can be another computer, a server, a router, a network PC, a client, or a peer device or other common network node. A logical connection interfaces with the data-processing apparatus 100 through a network interface 128. Such networking environments are commonplace in office networks, enterprise-wide computer networks, intranets, and the Internet. It will be appreciated by those skilled in the art that the network connections shown are provided by way of example, and that other means of and communications devices for establishing a communications link between the computers can be used.

The algorithms of the exemplary embodiment distinguish between 1) the spurious faults due to noisy monitors, 2) the transient faults due to unpredictable environmental/operational conditions, and 3) the true intermittent faults of the system under detection that may lead to permanent faults. The algorithms also incorporate the uncertainty level of the intermittency into fault isolation.

A monitor (algorithms) that monitors a system provides an indicator which takes the value of "1" when a fault is detected (indicting) and a value of "0" when there is no fault (exonerating). The monitor could be a direct signal from the system under detection (e.g. heartbeat), or a derived indicator from a phenomena related to the fault (e.g. vibration frequency). A monitor could be used to indict one or more faults, and a fault could trigger one or more monitors.

Five scenarios are provided which represent the typical intermittent situations discussed above. Note that in the figures discussed below, the recording of the data starts when the value of a monitor turns to "1" (indicting) at the first occurrence. Also note that as long as the data come in as a continuous string during the runtime, the data do not have to be periodic. While only one monitor is shown, multiple monitors and multiple faults may also be used.

Figure 2:
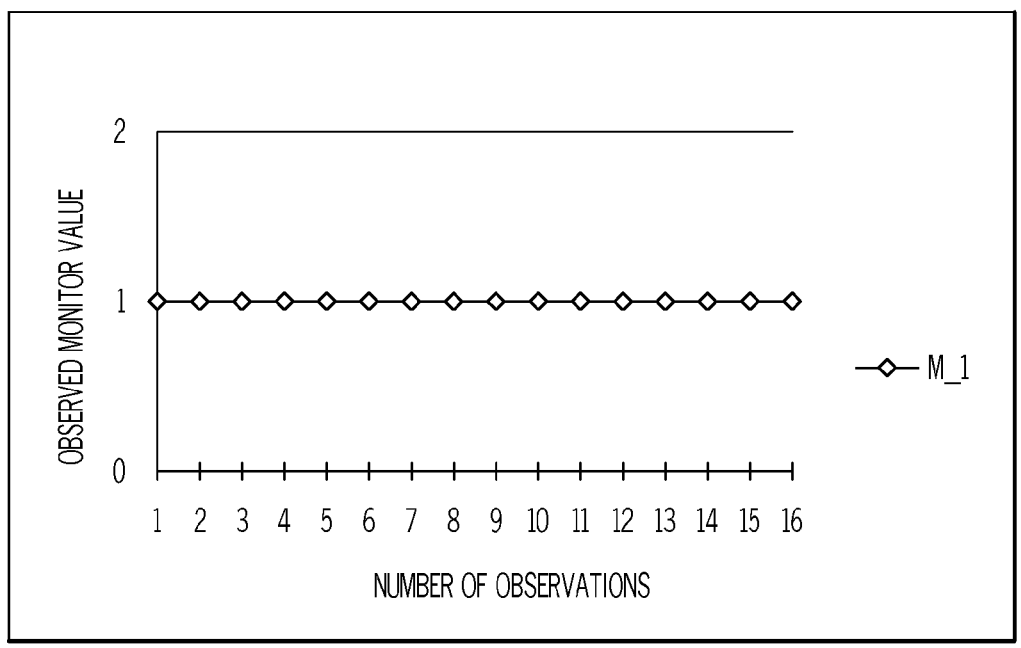
FIG. 2-6 are graphs illustrating five observational scenarios of a monitor value.

The first scenario (no intermittency) is when a monitor is triggered, and its value stays as M=1. It indicates a permanent fault (no intermittency), so M=1 can be used as designed to serve as an evidence for fault isolation (FIG. 2).

Figure 3:
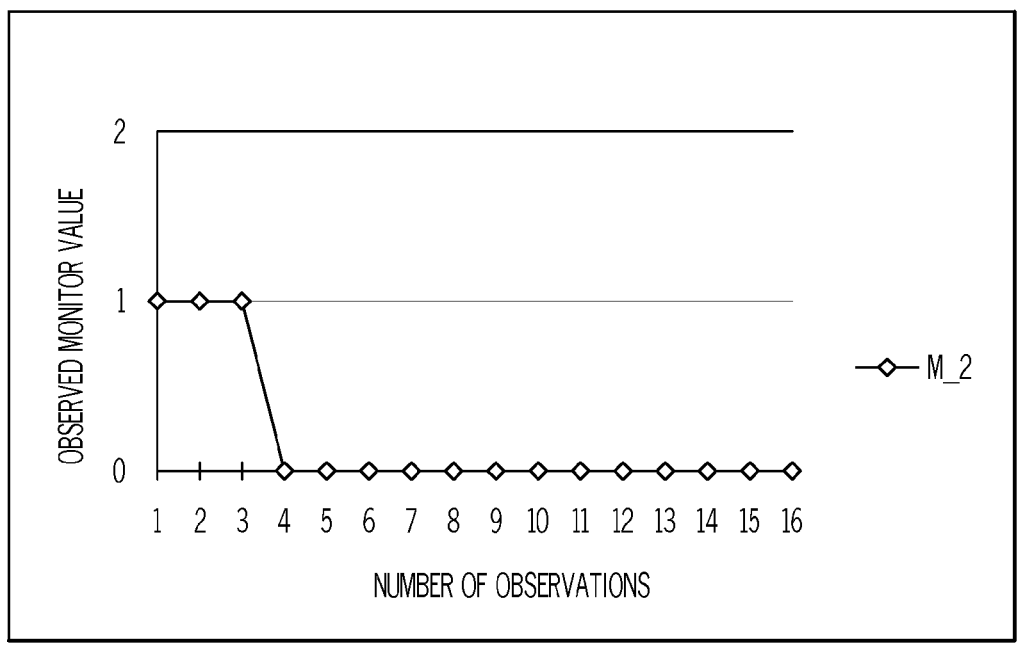

The second scenario represents a case when the monitor is triggered for a brief period of time, and then returns to exonerating (FIG. 3). This type of fault typically is caused by temporary operational/environmental conditions, so the indicting report disappears when the abnormal condition ceases. Conventional approaches in detecting such intermittency delays reporting the indicting status per a pre-defined time period. Although this conventional approach may eliminate some of the intermittent problems, it has a fundamental deficiency in that the frequency for the intermittency is very unpredictable resulting in the pre-defined delaying period being very subjective.

Figure 4:
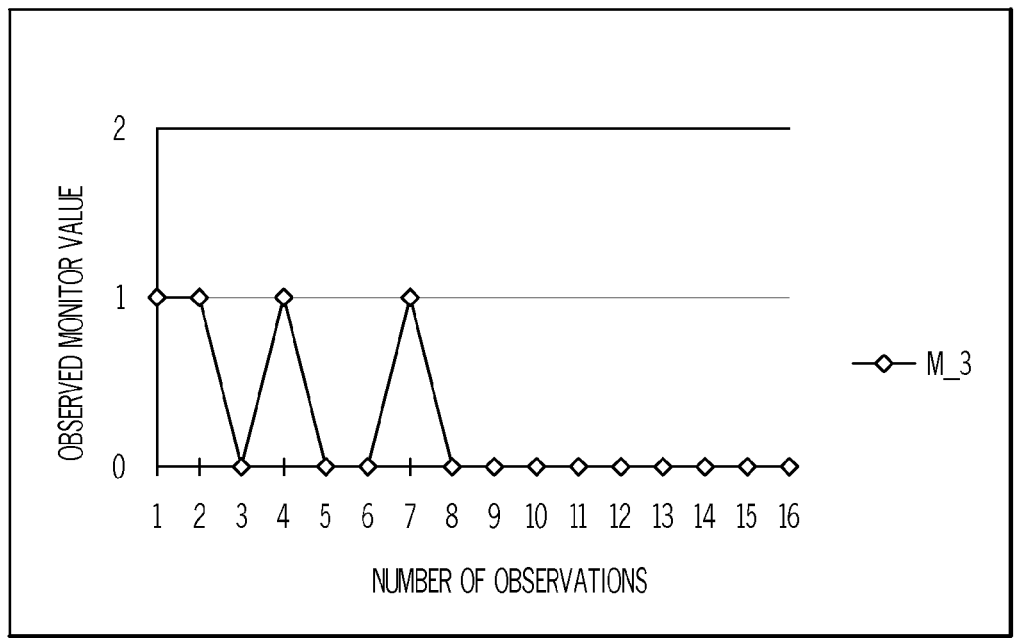

The third scenario (transient faults/conditions) represents the situation in which the monitor value switches back and forth between 1's and 0's (FIG. 4). Although only a few cycles are shown, it should be understood that many more cycles could happen. The value of the monitor is finally settled at M=0 (exonerating), indicating that the detected fault is transient. This intermittency may be due to either an intermittent fault, or a transient abnormal condition that the system experiences frequently during the time period.

Figure 5:
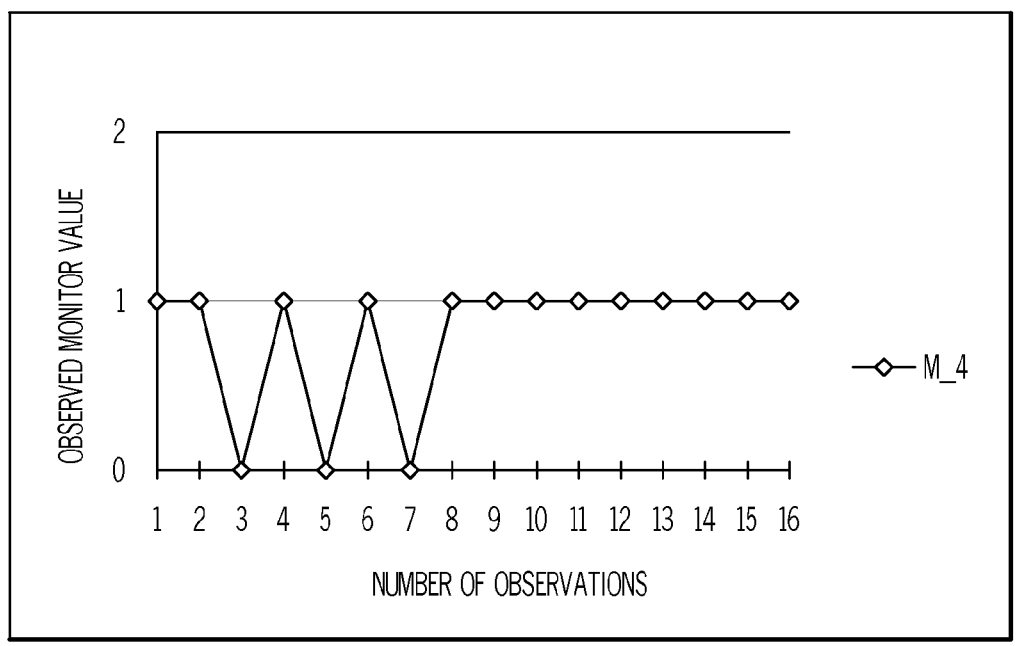

In the fourth scenario (intermittent fault to permanent fault), the monitor observation indicates (FIG. 5) that the fault is initially intermittent, and then transferred to a permanent fault. The intermittent period may be much longer than shown.

Figure 6:
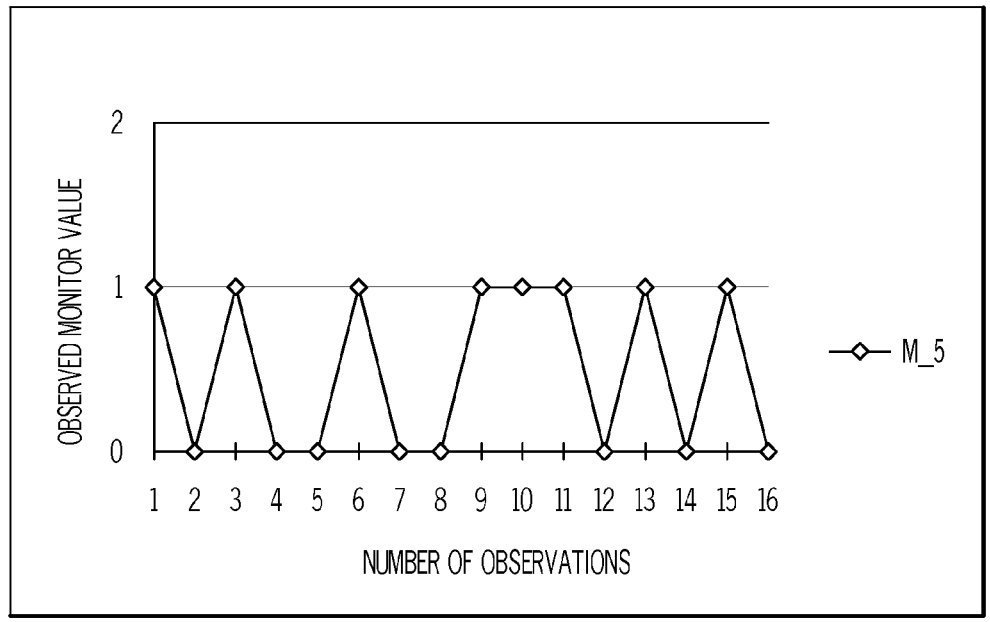

In the fifth scenario (noisy monitor or intermittent fault), the monitor value does not settle at either 0 or 1 during the operation of the system (FIG. 6). It may be due to either a noisy monitor or a continuous intermittent fault. The decision of whether it is because of a noisy monitor or an intermittent fault requires additional information (data). This will subsequently be discussed in more detail.

An algorithm that can automatically differentiate the above intermittent scenarios and then use the intermittency information to guide the fault isolation is very desirable in fault diagnostics. For differentiating the intermittency detection, the statistical sequential probability ratio (SPRT) test method is used.

The static algorithm parameters are defined as $p \leq p1$ being not noisy and $p \geq p2$ as being noisy, where p1 and p2 are user defined based on a system's tolerance level to noise (e.g. p1=0.1 and p2=0.4). When the true monitor value is 0, but the LRUI records 1, the error is less than $\alpha$. When the true monitor value is 1, but the LRUI records 0, the error is less than $\beta$. Again, $\alpha$ and $\beta$ are user defined based on the error tolerance of the system (e.g., $\alpha$=1% and $\beta$=1%). The dynamic observation parameters for each periodic monitor include 1) the total number of times that the monitor reports (starting by the first time the monitor reports value 1) is N_m, and 2) the total number of times that the monitor has switched to its state from 0 to 1 (including the initial 1) is N_s.

A main advantage of SPRT is that it does not require a pre-defined sample size, but the sample size can be accumulated during the operation until a decision is made regardless of whether the alternative hypothesis is true. This is an attractive feature: to apply to the detection of intermittency faults due to the unpredictability of the time period that an intermittent feature occurs, and a pre-defined delay period is not required.

It is assumed that a system is working normally, before any faults are detected. Therefore, the null hypothesis is M=0 (exonerating, i.e. no faults), and it is tested against the alternative hypothesis that M=1 (indicting, i.e. faults detected). Three outcomes may result from this approach, based on the observed values of M: 1) statistically M=0 (accept the null and reject the alternative hypothesis); 2) statistically M=1 (reject the null and accept the alternative hypothesis); and 3) undecided (with the existing data, no decision can be made). Note that in any of these three situations the monitor values can be 0 or 1 at a given time, and the decision is based on the statistical significance of the accumulated data. Therefore, intermittency of the monitor values is allowed in any of the situations. For 1) and 2), it is concluded that the monitor is not noisy, and the monitor value is set for fault isolation. For 3), either the monitor is noisy or there is a continuous intermittent fault, and further information is needed to differentiate the situation.

To formulate the testing, data is collected for intermittency analysis when the first time the monitor changes from 0 to 1 (first time indicting), as shown in FIGS. 4-8 and discussed above, and the total data points collected at a given time as N_m are counted. During the time N_m are counted, the total number of data points are also counted when M=1 as N_s. The probability that M=1 during the period is then p=N_s/N_m.

A lower probability is defined as p_low (e.g. 10%, or 0.1) and a higher probability is defined as p_high (e.g. 90%, or 0.9) so that when p<=p_low the null hypothesis is accepted with the false negative error of $\alpha$ (e.g. 0.001, or 0.1% chance that M=1 but tested as M=0), and when p>=p_high the alternative hypothesis is accepted with the false positive error of $\beta$ (e.g. 0.001, or 0.1% chance that M=0 but tested as M=1). When p_low<p<p_high, the decision cannot be made if M=0 or M=1.

Given the probability that the observed monitor value is "1", or p, and N_s number of M=1 in the sample N_m, the probability of obtaining the sample as observed is:

$$p^{N\_s}*(1-p)^{(N\_m-N\_s)}$$

With the hypothesis that p=p_high (M=1), the probability is:

$$p\_H=(p\_\text{high})^{N\_s}*(1-p\_\text{high})^{(N\_m-N\_s)}$$

And with the hypothesis that p=p_low (M=0), the probability is:

$$p\_L=(p\_\text{low})^{N\_s}*(1-p\_\text{low})^{(N\_m-N\_s)}$$

In accordance with SPRT theory, the testing criteria is:
1) When $\log(p\_H/p\_L) \geq \log((1-\beta)/\alpha)$, the alternate hypothesis is accepted, i.e. M=1.
2) When $\log(p\_H/p\_L) \leq \log(\beta/(1-\alpha))$, the null hypothesis is accepted, i.e. M=0.
3) Otherwise, it is undecided.

This is essentially the testing of the log relative likelihood of the probabilities for the two hypotheses.

With some manipulation of the equations, the following criteria can be obtained, expressed in the directly observed variables:

When N_s<=r_low_m, M=0
When N_s>=r_high_m, M=1
When r_low_m<N_s<r_high_m, undecided
where $$r\_low\_m = h1 + s*N\_m;\ r\_high\_m = h2 + s*N\_m,\ \text{and}$$

$$h_1 = \frac{\log\frac{\beta}{1-\alpha}}{\log\frac{p\_\text{high}}{p\_\text{low}} - \log\frac{1-p\_\text{high}}{1-p\_\text{low}}};$$

$$h_2 = \frac{\log\frac{1-\beta}{\alpha}}{\log\frac{p\_\text{high}}{p\_\text{low}} - \log\frac{1-p\_\text{high}}{1-p\_\text{low}}};$$

$$S = \frac{\log\frac{1-p\_\text{low}}{1-p\_\text{high}}}{\log\frac{p\_\text{high}}{p\_\text{low}} - \log\frac{1-p\_\text{high}}{1-p\_\text{low}}}$$

Figure 7:
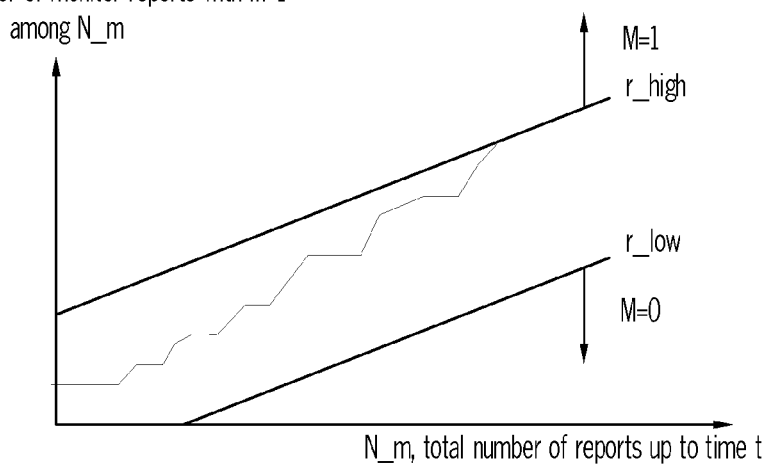
FIG. 7 is a graph illustrating the sequential probability ratio test.

Note again that N_m is the total observation points at a given time, and N_s is the total number of data points that M=1 among the N_m observations. A conceptual illustration of the test is shown in FIG. 7.

To demonstrate the method with the example scenarios, define p_low=0.1, p_high=0.95, $\alpha$=0.001, $\beta$=0.002. In other words, when the probability of M=1 during the sampling period is less than or equal to 0.1, the monitor value is tested to be M=0 with the decision error of 0.1%, and when the probability of M=1 is greater than or equal to 0.95, the monitor value is tested to be M=1 with the decision error of 0.2%. Given the above values, h1=−1.21, h2=1.34, and s=0.56.

Figure 9:
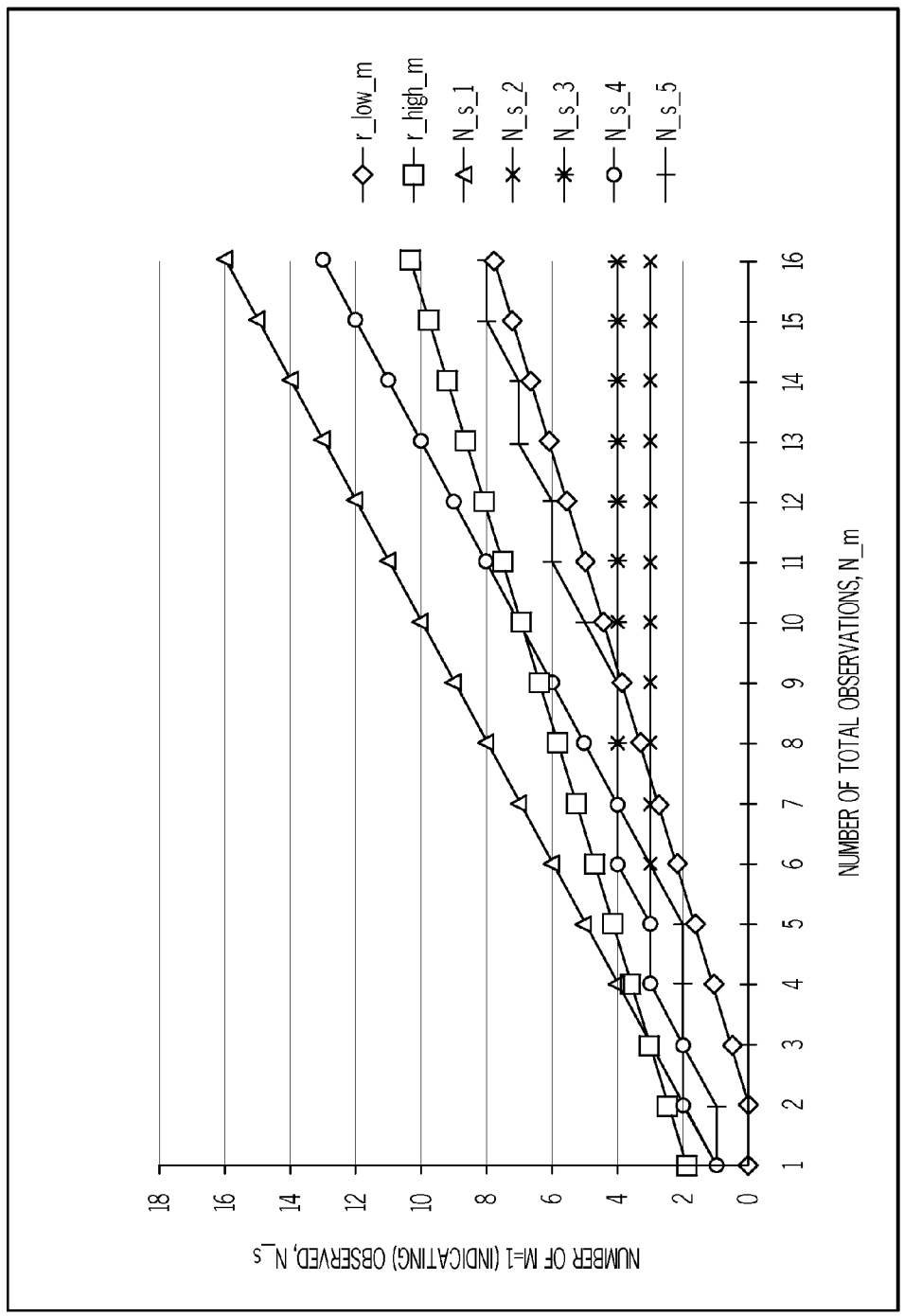
FIG. 9 is a graph of the observed values for the five scenarios from FIG. 8.

The table of FIG. 8 shows the value of M for each scenario above, with the total of 16 observation points (N_m) each. The N_s of each monitor is the accumulative value of the total number of M=1 observed during the period. For example, for scenario 1, since M=1 for all the observation points, the N_s__1 accumulates with each additional M=1 point. The test results are shown in FIG. 9.

These test results suggest that:

Scenario 1 is decided to be M=1 as early as the $4^{th}$ data point observed (N_s>r_high).

Scenario 2 is tested as a transient fault, where at the $8^{th}$ observation point it is decided that M=0 after a period of consistent report of M=0 (N_s<r_low).

Scenario 3 is also tested as a transient fault, although the earlier observations show a complex pattern of intermittency. It is decided at the $10^{th}$ observation point that M=0 (N_s<r_low).

Scenario 4 is tested as an intermittent fault at an earlier stage turns into permanent at the $10^{th}$ observation point (N_s>r_high).

Scenario 5 is undecided because N_s is bounded between r_low and r_high (r_low<N_s<r_high).

Note that the method allows the intermittent feature to last as long as operational time lasts and make a decision when statistical evidence is strong enough. The short intermittent periods used in the examples are for the convenience of discussion only. In other words, the method can tolerate an arbitrary length of the intermittency time periods that are unpredictable.

For implementation, the inputs of the method are p_low, p_high, α, and β as discussed above, which are determined beforehand and thus are static data, and can be monitor specific. These input data can be derived from a system's requirements. The only dynamic data that need to be tracked during the operation are the two numbers for each monitor, N_m and N_s, once the monitor is triggered and the SPRT process is initiated. This is a very low demand on the resources during operations, which makes the method very applicable even to the large systems with thousands of monitors.

Once the SPRT decided that a monitor is not noisy, i.e. M=1 or M=0, the monitor value can be used normally as evidence for fault isolation without uncertainties associated with intermittency. However, if the decision is undecided, further decision-making is needed in order to determine if the monitor is noisy or if there is an intermittent fault. If no decisions can be made, the uncertainties associated with the intermittency in the fault isolation need to be included.

Taking uncertainty into account for fault isolation requires that the uncertainty be quantified. Shannon's Entropy can be used to quantify the uncertainties. Given the probability that M=1 appears in the next observation as p, as we previously defined, the probability that M=0 appears in the next observation is then 1−p. Shannon's Entropy defines the uncertainty as:

$$H(p) = -p^{*}\log_{2}(p) - (1-p)\log_{2}(1-p)$$

Figure 10:
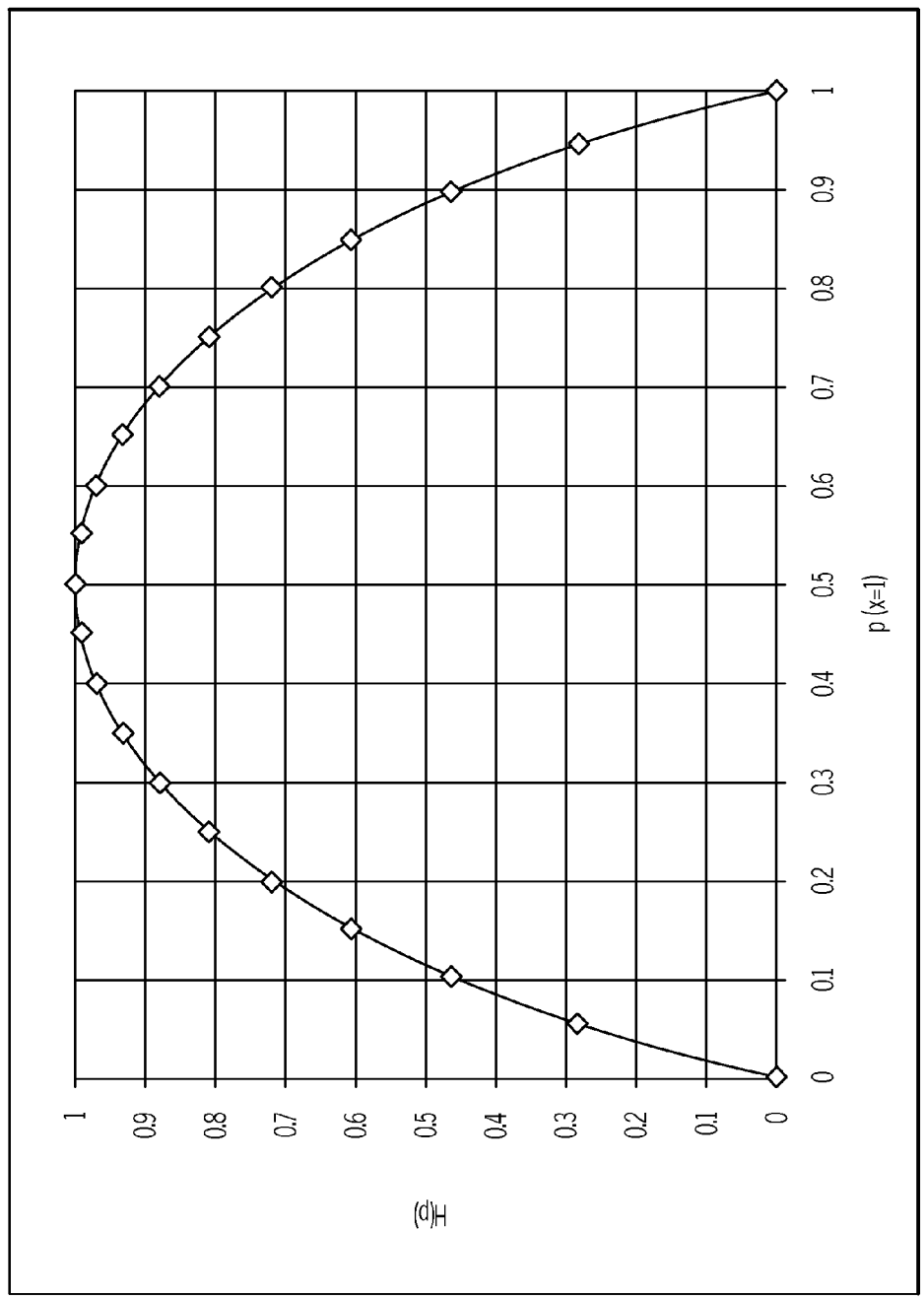
FIG. 10 is a graph of the change of uncertainty versus probability.

For $0 \leq H(p) \leq 1$, when p=0 or p=1, it is very certain what the value of M is (0 or 1). Therefore, H(p)=0. When p=0.5, it means that both 0 and 1 will have equal opportunity to appear, and thus is the most uncertain (random) case. Therefore, H(p)=1 in this case. FIG. 10 below shows the change of uncertainty with probability of M=1.

The H(p) values (uncertainty calculations) for scenarios 1 and 5 are shown in the Table of FIGS. 11 and 12, respectively, as examples. After the uncertainty is quantified by H(p), it can be used to modify the evidence strength, which is normally measured by the detection probability (denoted as d here) of a monitor to a failure mode, and the false alarm rate (denoted as f here) of a monitor. Due to the strong unpredictability of the intermittent features, it usually is very difficult to predefine the uncertainties through d and f. To include the effect of the uncertainty from intermittency, we can modify the predefined detection probability and false alarm rate as:

$$d_u = d(1-H(p));\ f_u = f(1+H(p))$$

In other words, when there is no uncertainty (H(p)=0), the original d and f will not be modified. However when the most uncertain situation happens (H(p)=1), the monitor's detection probability will become zero, i.e. no detection capability at all, and the false alarm rate is doubled.

Figure 13A:
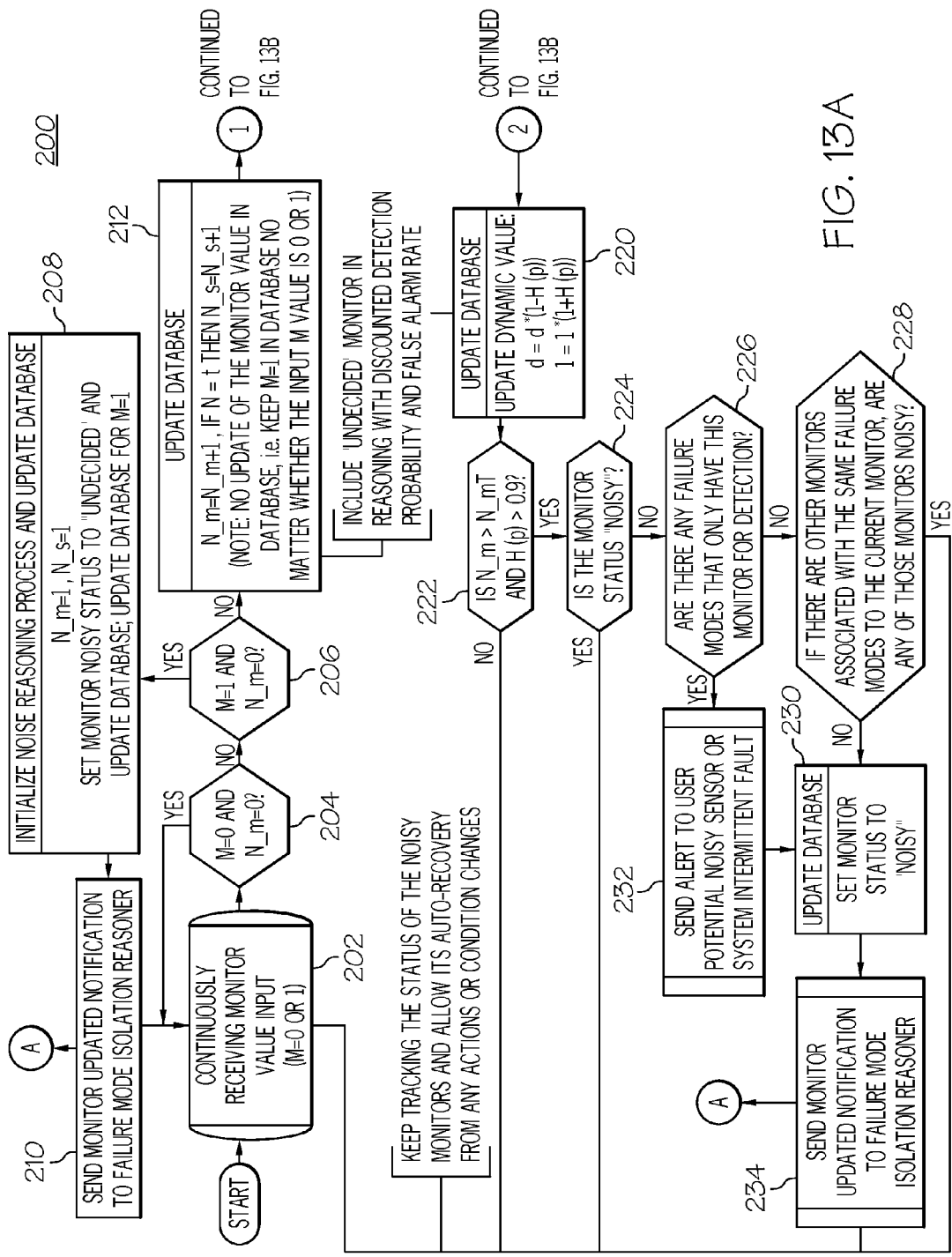
FIG. 13 is a flow chart of the monitor reasoning architecture.
Figure 13B:
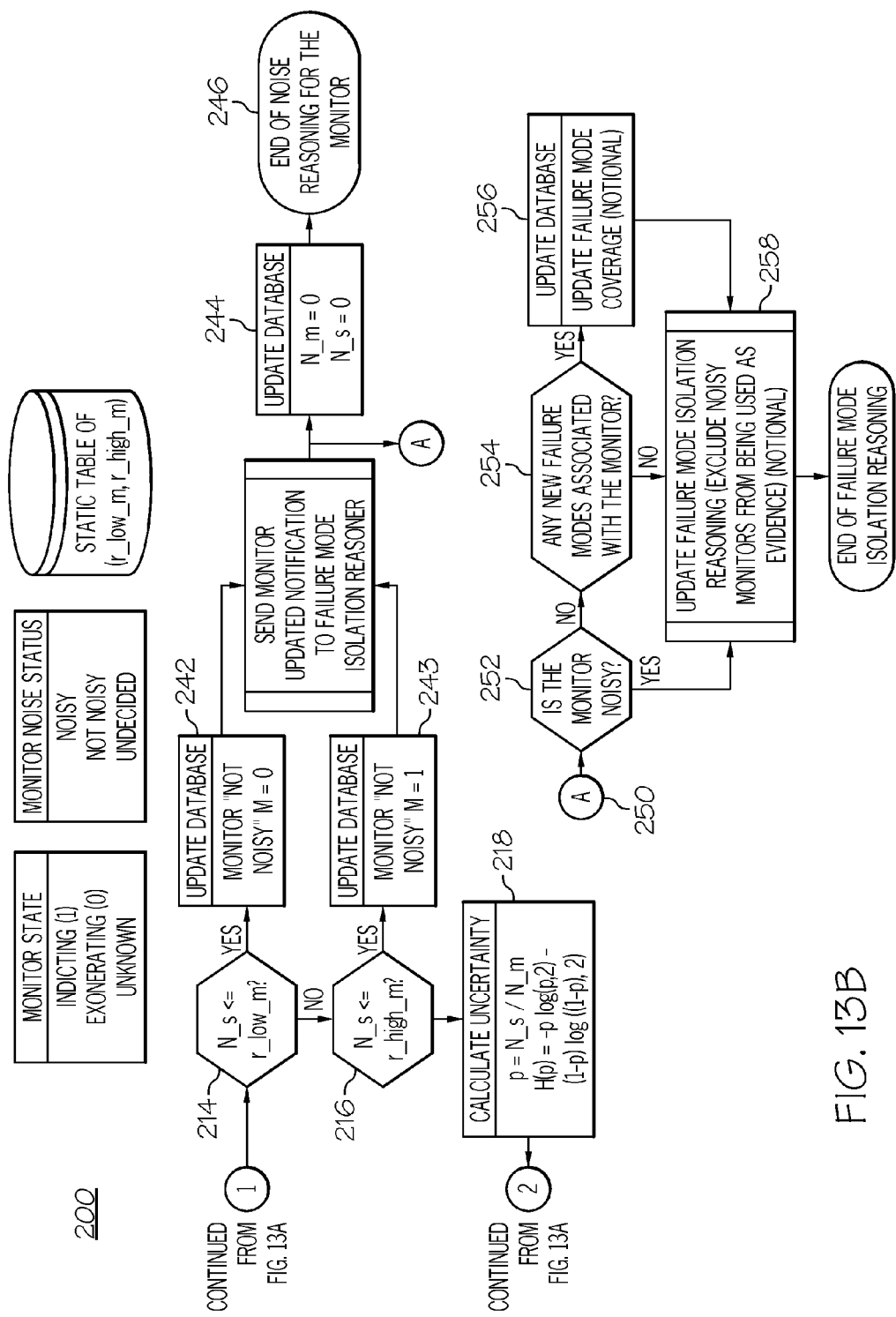

Based on the algorithms developed above, the reasoning architecture for the intermittency is provided as shown in FIG. 13. There are several further decision points involved in the algorithm, in addition to those previously discussed. When the SPRT cannot decide if M=0 or M=1 during the observational time (Scenario 5 above), and if the uncertainty is H(p)>0.9, a check is made if the noisy status is due to the monitor, or an intermittent fault, after an extended period of observations, N_mT. N_mT is defined as a period that the system is willing to tolerate an undecided noise status until which the system is willing to take additional information to make a decision. It could be as long as the operating period, if the user decides to do so. Not all the situations can be conclusive even with additional information; however, for a couple of situations below, conclusions may be made or actions taken, with additional information.

When the monitor is only associated with one failure mode and the failure mode only has this one monitor for detection, it cannot be concluded if the noisy status is due to the monitor's fault or the system's intermittent fault. However one of them must be wrong. In this case an alert is sent to the user and then denote the monitor as noisy to avoid further fault reasoning based on the noisy information. Note that the noisy monitor is still under testing with each new monitor value coming in, so it may be decided in case any actions or conditions in the future affect the monitor values.

When a failure mode has multiple monitors associated therewith, the noisy status of the other monitors can be used to differentiate if the noisy status is due to the noisy monitor or the intermittent fault. If other monitors are not noisy, then it may be concluded that the monitor under test is noisy. Otherwise a decision cannot be made and further observations are required.

The steps of the method 200 disclosed in FIG. 13 specifically include continuously receiving 202 a monitor values input (M=0 or 1) at the monitor. If M=0 and N_m=0 are satisfied 204, step 202 is repeated. If M=0 and N_m=0 are not satisfied 206, but M=1 and N_m=0 are satisfied 206, the process is initialized and the database is updated by setting the monitor noisy status to undecided, and the monitor state and monitor noise status is updated. A monitor updated notification is sent 210 to a failure mode isolation reasoner and step 202 is repeated. If neither M=0 and N_m=0 and M=1 and N_m=0 are satisfied, the database is updated 212 to N_m=N_m+1 and if N=1, setting N_s=N_s+1. In steps 214, 216, if either N_s≦r_LOW_m or N_S≧R_high_m are satisfied, the database is updated 242, 243 to reflect the monitor is not noisy (M=0, M=1, respectively), a monitor updated notification is sent 244 to the failure mode isolation reasoner, and the database is updated 246 by N_m=0 and N_s=0.

If neither N_s≦r_low_m and N_S≧R_high_m are satisfied 214, 216, Shannon's Entropy theory is used to calculate 218 the uncertainty p=N_s/N_m, H(p)=−p log(p,2)−(1−p)log((1−p), 2) and update 220 the database for a dynamic value of d=d*(1−H(p)) and f=f*(1+H(p)). If N_m>N_mT and H(p)>0.9 is not satisfied and the monitor is noisy, step 206 is repeated. However, if step 222 is satisfied and step 224 is not, a determination 226 is made if there are any failure modes that only have this monitor for detection. If not and if there are other monitors associated with the same failure modes to the current monitor that are noisy 228, the database is updated by setting 230 the monitor to noisy. Alternatively, if in step 226 is a yes, an alert is sent 232 to the user signifying there is a potential noisy sensor or a system intermittent fault before setting 230 the monitor to noisy. A monitor updated notification is sent 234 to the failure mode isolation reasoner and step 206 is repeated.

A subroutine 250 is performed after steps 210, 234, and 244. Subroutine 250 includes determining if the monitor is not noisy 252, and if any new failure modes are associated with the monitor 254, the failure mode coverage (notional) is updated 256. If step 252 is affirmative and step 254 is negative, the failure mode isolation reasoning is updated 258.

Algorithms and architectures have been described herein that are designed for the detection and reasoning of noisy monitors and intermittent faults. The algorithms allow the detection of the intermittency for any given period of time during real-time operations, and allow the effect of uncertainty due to intermittency to be included in the fault isolation. The algorithms can robustly deal with and make decision on the permanent, transient, and intermittent faults, as well as the detection of the noisy monitors.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method of detecting and diagnosing system faults, comprising
a) collecting data;
b) performing a first assessment of a monitor of the data to determine whether the monitor is noisy;
c) if the monitor is not noisy, determining fault isolation;
d) if it cannot be determined that the monitor is noisy, collect additional data;
e) performing a second assessment whether the monitor is noisy or there is an intermittent fault;
f) if the second assessment cannot be performed, determining uncertainties.

2. The method of claim 1 wherein the determining step comprises:
using Shannon's entropy theory.

3. The method of claim 1 wherein the steps b-e comprise:
using the sequential probability ratio statistical test.

4. The method of claim 3 wherein the determining step comprises:
using Shannon's entropy theory.

5. The method of claim 1 further comprising:
converting the detection of the noisy status to a diagnostic monitor.

6. The method of claim 1 wherein steps b-e comprise:
distinguishing between a spurious fault due to noisy monitors, a transient fault due to unpredictable conditions, and an intermittent fault.

7. A method of detecting and diagnosing system faults, comprising:
a) continuously receiving a monitor values input (M=0 or 1) at the monitor;
b) if M=0 and N_m=0 are satisfied, repeating step a);
c) if M=0 and N_m=0 are not satisfied, but M=1 and N_m=0 are satisfied:
    d) initializing a database by setting N_m=1, N_s=1, M=1, set the monitor noisy status of a monitor to "undecided", and update the monitor state and the monitor noise status;
    e) sending a monitor updated notification to a failure mode isolation reasoner; and
    f) returning to step a);
g) if neither (M=0 and N_m=0) nor (M=1 and N_m=0) are satisfied, updating the database by setting N_m=N_m+1 and, if N=1, setting N_s=N_s+1;
h) if N_s≦r_low_m satisfied:
    i) update the database to monitor "not noisy, M=0";
    j) send a monitor updated notification to the failure mode isolation reasoner; and
    k) updating the database by N_m=0 and N_s=0;
l) if N_s≦r_low_m is not satisfied and N_S≧r_high_m is satisfied:
    m) update the database to monitor "not noisy, M=1"; and
    n) send a monitor updated notification to the failure mode isolation reasoner; and
    o) updating the database by N_m=0 and N_s=0;
p) if neither N_s≦r_low_m and N_s≧r_high_m are satisfied, apply Shannon's Entropy theory by:
    q) calculating the uncertainty p=N_s/N_m, H(p)=−p log(p,2)−(1−p)log((1−p), 2);
    r) updating the database for a dynamic value of d=d*(1−H(p)) and f=f*(1+H(p));
    s) if N_m>N_mT and H(p)<0.9 is not satisfied or the monitor is noisy, repeat from a);
t) N_m>N_mT and H(p)<0.9 is satisfied and the monitor is not noisy, gather additional information including the steps of:
    u) determining if there are any failure modes that only have this monitor for detection;
    v) if step u) is not satisfied and if there are other monitors associated with the same failure modes to the current monitor that are noisy;
    w) update the database by setting the monitor to noisy;
    x) sending a monitor updated notification to a failure mode isolation reasoner; and
    y) repeating from step a);
    z) if step u) is satisfied:
        aa) sending an alert to the user signifying there is a potential noisy sensor or a system intermittent fault; and
        bb)) setting the monitor to noisy;
        cc) sending a monitor updated notification to a failure mode isolation reasoner; and
        dd) repeating from step a);
ee) in response to the monitor updated notification to the failure mode isolation reasoner of steps e), j), n), x), and cc), and if the monitor is not noisy and if any new failure modes are associated with the monitor:
ff) updating a failure mode coverage; and
gg) updating the failure mode isolation reasoning by excluding noisy monitors from being considered;
hh) in response to the monitor updated notification to the failure mode isolation reasoner of steps e), j), n), x), and cc), and if the monitor is not noisy and if no new failure modes are associated with the monitor:

ii) updating the failure mode isolation reasoning by excluding noisy monitors from being considered;
jj) in response to the monitor updated notification to the failure mode isolation reasoner of steps e), j), n), x), and cc), and if the monitor is noisy:
kk) updating the failure mode isolation reasoning by excluding noisy monitors from being considered.

* * * * *